March 2, 1937. F. M. CARPENTER 2,072,513
AUXILIARY SEAT
Filed March 12, 1935
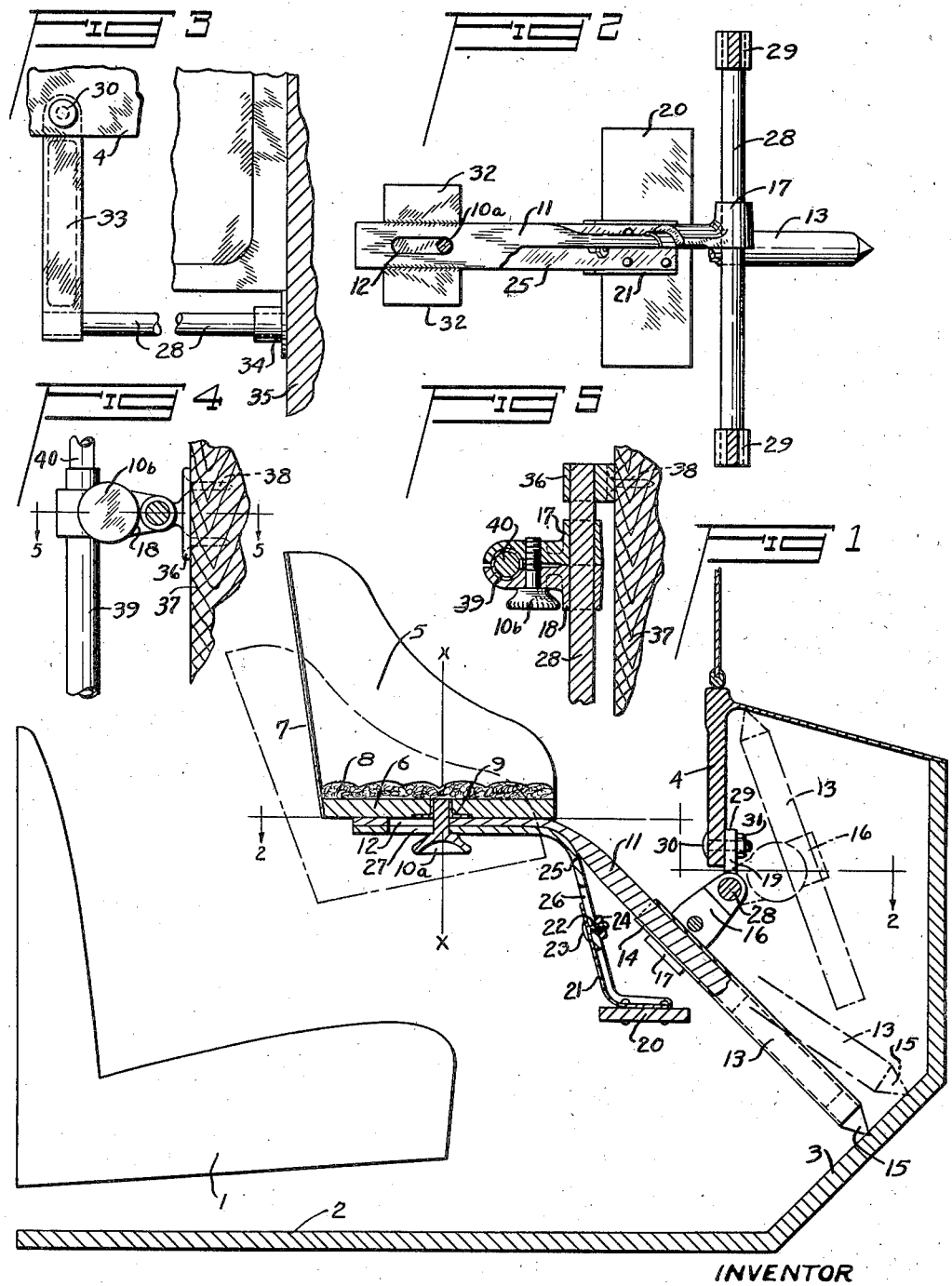
INVENTOR
Floyd M. Carpenter Patented Mar. 2, 1937

2,072,513

UNITED STATES PATENT OFFICE 2,072,513

AUXILIARY SEAT

Floyd M. Carpenter, Dayton, Ohio

Application March 12, 1935, Serial No. 10,677

7 Claims. (Cl. 155—10)

My invention provides an auxiliary seat having the space occupying portions thereof readily demountable for compact storage.

It is adapted to ready setup in vehicles having compact aisle and seating space, particularly where aisle space suitable for emergency seating is at times left vacant.

It is a further object of my invention to provide a seat capable of assuming a large number of varied positions with a minimum amount of mechanical adjustment.

My invention finds particular adaptation to the holding of infants during transit in those numerous and often varied positions so essential to the comfort of both infant and parent.

With the foregoing and other objects in view, which will appear as the description proceeds, the invention consists of certain new and novel improvements in auxiliary seats, which will be hereinafter more fully illustrated and described in the accompanying drawing and more particularly pointed out in the appended claims.

Referring to the drawing, in which numerals of like character designate similar parts throughout the several views:

Fig. 1 shows a side view of my invention adapted to the driving compartment of an automobile.

Fig. 2 is a plan view of that portion of Fig. 1 lying beneath the line 2—2.

Fig. 3 shows a support modification where the driving compartment is provided with a glove compartment.

Fig. 4 shows further support modification whereby my invention is adapted to the end or side walls of passenger carrying compartments.

Fig. 5 is a cross-sectional view taken on the line 5—5 of Fig. 4.

In Fig. 1 a passenger seat 1, a floor 2, a foot board 3, and a panel, hereinafter designated as "the instrument board 4" are shown in cross-section, in representative scale. A body support, hereinafter designated as "seat 5", is spaced to the rear of the instrument board 4. It is composed of a base 6, a back 7, and a cushion 8. For simplicity, a "bucket" type of "back" has been illustrated. It is readily apparent that any one of several well-known adjustable seat backs may be substituted for the back 7 without departing from the spirit of my invention. The base 6 is provided with a threaded flange 9 and clamping knob 10a. A body support bracket, hereafter designated as "the seat bracket 11", is fabricated from a rod flattened at its upper end and bent to suit each installation requirement. The flattened portion of the seat bracket 11 is provided with an elongated opening 12 permitting free longitudinal movement of the stem portion of the clamping knob 10a therewithin. The lower end of the seat bracket 11 is adapted to telescope within a mounting post 13, the combined parts forming a "standard" for the seat 5. The upper extremity of the mounting post 13 is provided with a narrow slot 14, while its lower extremity is provided with a point 15, adapted to frictionally engage the floor 2, foot board 3, or other fixed portion of the vehicle. The telescoping ends of the seat bracket 11 and the mounting post 13 are slidably encased within a clamping bracket 16, composed of symmetrical halves 17 and 18; the latter half being removed to permit a better showing of the parts therebeneath. The stem portion of a second clamping knob 10b is also shown, by means of which the jaw portions of the halves 17 and 18 are brought into locking engagement with the aforesaid telescoping ends, the slot 14 decreasingly narrowing as the clamping knob 10b is screwed fast. The upper ends of the halves 17 and 18 are adapted at all times to freely rotate and slide upon a clamping bracket support 19.

I have set forth in the preceding paragraphs those parts basically essential to proper functioning of my invention in the many types of vehicles to which it may be applied. In the following paragraphs, additional auxiliary parts of limited function will be discussed in detail.

Fig. 1 shows my invention adapted to the carrying of infants or children of tender years. It is therefore essential that a foot rest 20 be provided for the seat 5. A lower foot rest bracket 21, U-shaped in cross-section, is riveted at its base to the foot rest 20. The upper end of the bracket 21 is provided with a hole 22, bolt 23, and lock nut 24. An upper foot rest bracket 25 is adapted to freely slide within the U of the bracket 21. The bracket 25 is made of flat stock, L-shaped in side elevation and of constant cross-section. Its lower extremity is provided with a slotted hole 26 adapted to slidingly engage the bolt 22. Its upper extremity is provided with an elongated opening 27 identical to the elongated opening 12 in the seat bracket 11. Adjustment of the seat 5 and the foot rest 20 is discussed below. The clamping bracket support 19 is composed of a rod 28 and rod brackets 29 (one only shown) fixedly secured to the instrument board 4 by means of bolts 30 and nuts 31.

In Fig. 2, the seat 5 has been removed to better show a plan view of the parts lying therebeneath. No additional description is required other than to note that plates 32 have been welded to either side of the seat bracket 11 in the region of the elongated opening 12.

Fig. 3 shows minor modification of the clamping bracket support 19 (of Fig. 2) in those driving compartments of automobiles which are provided with a glove compartment to the right of the passenger's seat. There is no change in the rod 28. A rod bracket 33 is secured to the instrument board 4 in a manner identical to the attachment of the rod bracket 29 shown in Fig. 1. A second rod bracket 34, of socket type, is attached to vehicle body portion 35.

The operation of my invention is as follows: The mounting post 13 and clamping bracket 16, when inoperative, are carried in the upsidedown position noted in the dot-dash outline of Fig. 1. The seat 5, clamping knob 10a, seat bracket 11 and foot rest assembly, when not in use, are disassembled and put in any convenient place of storage. Let it be assumed that the last-named parts are removed from storage and temporarily positioned in the part attitudes of Figs. 1 and 2. The seat 5 may be subjected to five separate and distinct adjustments, as follows.

Without loosening either of the clamping knobs 10a or 10b, the seat 5 may be tilted upward about the longitudinal axis of the rod 28. The point 15 having been thus freed from the foot board 3, the clamping bracket 16 may be readily adjusted laterally along the rod 28. Return of the point 15 to the foot board 3 locks the seat 5 against lateral movement.

By loosening the clamping knob 10a, a second and third adjustment of the seat 5 may be accomplished. The seat 5 may be rotated 360 degrees about the axis X—X or the axis X—X may be moved horizontally away from the instrument board 4, within the longitudinal limits of the elongated opening 12. The former adjustment may be termed pivotation and the latter fore-and-aft sliding adjustment of the seat 5.

During execution of the above seat adjustments the foot rest assembly may also be rotated 360 degrees about the axis X—X in conformity with seat adjustment or independent thereof. The foot rest 20 may also be raised or lowered within the limits of the slotted hole 26 or horizontally displaced from or towards the axis X—X within the limits of the elongated opening 27.

By loosening the clamping knob 10b, a fourth and fifth adjustment may be accomplished. Without relative movement between the mounting post 13 and the clamping bracket 16, the seat bracket 11 may be increasingly or decreasingly telescoped within the mounting post 13 to cause lowering or raising of the seat 5 with respect to the floor. If, upon the other hand, the seat bracket 11 is held in fixed relationship with the mounting post 13 and the whole slightly raised with respect to the clamping bracket 16, the mounting post 13 and point 15 will assume the position indicated by the dot-dash outline of Fig. 1. The seat 5 will assume a corresponding position indicated by the dot-dash outline of Fig. 1. The former adjustment may be termed raising and lowering of the seat 5, while the latter is best described as fore-and-aft tilting adjustment.

It is obvious that any one or more of the aforesaid seat adjustments may be made singly or in combination.

Fig. 4 shows further modification of rod bracket 29 (of Figs. 1 and 2), to permit installation of my invention in the rear compartment of a pleasure automobile, upon the side or end walls of an automobile buss, upon the side or end walls of an airplane fuselage, or within the body portion of an airship or water craft. A rod bracket 36 is fixed to vehicle wall structure 37 by means of screws 38. A mounting post 39 is regulated in length by height of the rod bracket 36 above the vehicle floor (not shown). Plan disposition of the same parts is shown in Fig. 5. Slight modification of a seat bracket 40 is required in that the upper L portion thereof is bent at approximately right angles and somewhat lengthened to carry the seat 5 (not shown) away from the structure 37. If the rod bracket 36 is secured to a forward vehicle wall, the seat adjustments are identical to those of Figs. 1 and 2. If attachment is made in a rear vehicle wall the seat adjustments, other than lateral, are just the reverse of the above. When mounted upon the side walls of vehicles, the seat may not be tilted "fore-and-aft", the rod 28 being initially installed at that "tilt" best suited to the passengers' comfort. It should be noted that the foot rest assembly shown in Figs. 1 and 2 does not form part of the installation shown in Figs. 4 and 5.

I claim as my invention:

1. In a vehicle seat, a body supporting portion, means for mounting said body supporting portion comprising a lower standard portion having means for holding the same in rigid relation with respect to a plane surface of said vehicle and an upper standard portion longitudinally slidably engaging said lower standard portion, means securing said body support to said upper standard portion for sliding along said standard portion and for pivoting about an axis approximately normal thereto, clamping means securing said standard portions against relative movement, and means securing said clamping means to a fixed portion of said vehicle for hinged movement about a horizontal axis and for sliding movement therealong.

2. In a vehicle seat, a body support, means for mounting said body support comprising a mounting post having its base provided with means for holding the same in rigid relation with respect to a plane surface of said vehicle and a body support bracket longitudinally slidably engaging said mounting post, means securing said body support to said body support bracket for sliding along said bracket and for pivoting about an axis approximately normal thereto, a clamping bracket securing said body support bracket and mounting post against relative movement, and a clamping bracket support securing said body support and attached standard to a fixed portion of said vehicle for hinged movement about a horizontal axis and for sliding movement therealong.

3. In a vehicle seat, a body support, means mounting said body support in a vehicle comprising a tubular mounting post slotted at one end and having its other end provided with means for holding the same in rigid relation with respect to a plane surface of said vehicle and a longitudinally extending body support bracket having one extremity telescoped within the slotted portion of said mounting post, means slidably and pivotally securing said body support to said body support bracket for sliding along said bracket and for pivoting about an axis at right angles thereto, a clamping bracket telescopically engaging the aforesaid slotted portion of said mounting post for securing said body support bracket and mounting post against relative telescoping movement, and means securing said clamping bracket to a fixed portion of said vehicle for hinged movement about a horizontal axis and for sliding movement therealong.

4. In a vehicle seat, a body support having a base flange provided with a threaded vertical opening, a clamping knob having a stem engaging said threaded opening, a body support bracket having a flattened portion bearing against said base flange including an elongated hole slidably receiving the stem of said clamping knob, a mounting post having one end provided with means for holding the same in rigid relation with respect to a plane surface of said vehicle and its other end longitudinally slidably engaging the lower extremity of said body support bracket, a clamping bracket securing said body support bracket and mounting post against relative telescopic movement, and means securing said clamping bracket to a fixed portion of said vehicle for hinged movement about a horizontal axis and for sliding movement therealong.

5. In a vehicle seat, a body support having a base flange provided with a threaded vertical opening, a clamping knob having a stem engaging said threaded opening, a body support bracket having a flattened portion bearing against said base flange including an elongated hole slidably receiving the stem of said clamping knob, a foot rest bracket having one end bearing against the flattened portion of said body support bracket and including an elongated hole slidably receiving the stem of said clamping knob, a foot rest fixed to the other end of said foot rest bracket, a mounting post having one end provided with means for holding the same in rigid relation with respect to a plane surface of said vehicle and its other end longitudinally slidably engaging the lower extremity of said body support bracket, a clamping bracket securing said body support bracket and mounting post against relative telescopic movement, and means securing said clamping bracket to a fixed portion of said vehicle for hinged movement about a horizontal axis and for sliding movement therealong.

6. The combination with a vehicle body, its floor and a wall or panel fixed with respect thereto, of the body supporting portion of a seat, means mounting said body supporting portion in said vehicle comprising a lower member having its base provided with means for holding the same in rigid relation with respect to the aforesaid floor or wall and an upper member longitudinally slidably engaging said lower member, means securing the base of said body support to said upper body supporting member for sliding movement therebetween and pivoting movement at right angles to the aforesaid base, clamping means securing said upper and lower body support mounting members against relative movement, and means securing said clamping means to a wall or panel of said vehicle for hinged movement about a horizontal axis and for sliding movement therealong.

7. The combination with a vehicle body, its floor and a wall or panel fixed with respect thereto, of the body supporting portion of a seat, means mounting said body supporting portion in said vehicle comprising a mounting post having its base provided with means for holding the same in rigid relation with respect to the aforesaid floor or wall and a body support bracket longitudinally slidably engaging said mounting post, means securing the base of said body support to said body support bracket for sliding movement therebetween and pivoting movement at right angles to the aforesaid base, a clamping bracket securing said body support bracket and mounting post against relative movement, and means securing said clamping bracket to a wall or panel of said vehicle for hinged movement about a horizontal axis and for sliding movement therealong.

FLOYD M. CARPENTER.